United States Patent
Kischkat et al.

(10) Patent No.: US 8,131,468 B2
(45) Date of Patent: Mar. 6, 2012

(54) APPARATUS AND METHODS FOR ESTIMATING A DOWNHOLE PROPERTY

(75) Inventors: Tobias Kischkat, Nieders (DE); Ansgar Cartellieri, Lower Saxony (DE)

(73) Assignee: Baker Hughes Incorporated, Houston, TX (US)

( * ) Notice: Subject to any disclaimer, the term of this patent is extended or adjusted under 35 U.S.C. 154(b) by 606 days.

(21) Appl. No.: 12/333,514

(22) Filed: Dec. 12, 2008

(65) Prior Publication Data
US 2010/0153014 A1 Jun. 17, 2010

(51) Int. Cl.
*G01V 1/40* (2006.01)

(52) U.S. Cl. ............... 702/6; 166/302; 166/57; 166/248; 175/24; 175/40; 73/152.22; 73/152.28; 73/152.11; 73/1.03

(58) Field of Classification Search ...... 702/6; 166/302, 166/57, 58, 288, 254.2, 248; 175/16, 17, 175/24, 40; 73/1.03, 152.11, 152.28, 152.22
See application file for complete search history.

(56) References Cited

U.S. PATENT DOCUMENTS

| | | | |
|---|---|---|---|
| 2,433,554 A | 12/1947 | Herzog | |
| 3,121,998 A | 2/1964 | Minoru Nagata | |
| 3,167,653 A | 1/1965 | Rumble et al. | |
| 4,230,945 A | 10/1980 | Meir et al. | |
| 4,238,759 A | 12/1980 | Hunsperger | |
| 4,575,629 A | 3/1986 | Schnell et al. | |
| 4,685,081 A | 8/1987 | Richman | |
| 4,825,078 A | 4/1989 | Huber et al. | |
| 6,176,323 B1* | 1/2001 | Weirich et al. .................. 175/40 |
| 6,206,108 B1* | 3/2001 | MacDonald et al. ........... 175/24 |
| 7,268,019 B2 | 9/2007 | Golla et al. | |
| 7,363,971 B2* | 4/2008 | Rodney et al. ............. 166/254.2 |
| 7,571,770 B2* | 8/2009 | DiFoggio et al. ............. 166/302 |
| 7,601,950 B2* | 10/2009 | Kischkat et al. ........... 250/269.1 |
| 7,720,323 B2* | 5/2010 | Yamate et al. .................. 385/12 |
| 7,748,265 B2* | 7/2010 | Reid et al. .................. 73/152.11 |
| 7,806,173 B2* | 10/2010 | Kaul et al. ....................... 166/57 |
| 2004/0084442 A1* | 5/2004 | La Rovere .................... 219/643 |
| 2004/0149443 A1* | 8/2004 | La Rovere et al. ............. 166/302 |
| 2004/0264543 A1* | 12/2004 | Storm et al. .................. 374/141 |
| 2005/0149264 A1* | 7/2005 | Tarvin et al. ....................... 702/6 |
| 2005/0284636 A1* | 12/2005 | La Rovere et al. ............. 166/302 |
| 2006/0213660 A1* | 9/2006 | DiFoggio et al. .......... 166/254.2 |
| 2007/0229082 A1* | 10/2007 | Vehra et al. .................... 324/339 |
| 2008/0066534 A1* | 3/2008 | Reid et al. .................. 73/152.11 |
| 2008/0314137 A1* | 12/2008 | Proett et al. ................. 73/152.22 |
| 2008/0314638 A1* | 12/2008 | Kaul et al. ....................... 175/17 |
| 2009/0200016 A1* | 8/2009 | Goodwin et al. .............. 166/248 |
| 2010/0095758 A1* | 4/2010 | Georgi et al. .............. 73/152.28 |
| 2010/0223989 A1* | 9/2010 | Reid et al. .................. 73/152.11 |
| 2011/0061439 A1* | 3/2011 | Dong et al. ..................... 73/1.03 |

OTHER PUBLICATIONS

APS Technology, "Thermoelectric High-Temperature Cooling System", APS Technology, Inc., www.aps-tech.conn, Cromwell, CT.

* cited by examiner

*Primary Examiner* — Carol S Tsai
(74) *Attorney, Agent, or Firm* — Cantor Colburn LLP

(57) ABSTRACT

Apparatus and methods for estimating a downhole property are provided. The apparatus may include a downhole tool having a predetermined temperature calibration based at least in part on an expected downhole temperature and a temperature controller in communication with the downhole tool that maintains a downhole tool temperature substantially within the predetermined temperature calibration. A method may include conveying a downhole tool having a predetermined temperature calibration based at least in part on an expected downhole temperature in a well borehole and adjusting the temperature of the downhole tool during downhole operation to maintain a downhole tool temperature substantially within the predetermined temperature calibration.

17 Claims, 3 Drawing Sheets

APPARATUS AND METHODS FOR ESTIMATING A DOWNHOLE PROPERTY

BACKGROUND

1. Technical Field

The present disclosure generally relates to well bore tools and in particular to methods and apparatus for downhole sample evaluations.

2. Background Information

Oil and gas wells have been drilled at depths ranging from a few thousand feet to as deep as five miles. Information about the subterranean formations traversed by the borehole may be obtained by any number of techniques. Techniques used to obtain formation information include obtaining one or more formation fluid samples and/or core samples of the subterranean formations, for example. These samplings are collectively referred to herein as formation sampling.

Modern fluid sampling includes various downhole tests and sometimes fluid samples are retrieved for surface laboratory testing. It is often desirable to evaluate fluids in the downhole environment to estimate various characteristics and properties of the fluids. Downhole evaluations where the fluid under investigation remains substantially at downhole conditions increases efficiency of the operation by reducing or eliminating the need to remove the evaluation tool and/or fluid sample from the borehole and provide more accurate estimates by maintaining the fluid at substantially downhole conditions.

The downhole conditions, such as temperature and pressure, are greater than conditions at the surface. The increase in temperature and/or pressure, for example, can reduce the accuracy of downhole testing tools, such as detectors, which can result in inaccurate downhole sample property measurements. There is a need, therefore, for improved apparatus and methods for downhole sample property estimations.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

Disclosed is an apparatus for estimating a downhole property that includes a downhole tool having a predetermined temperature calibration based at least in part on an expected downhole temperature and a temperature controller in communication with the downhole tool that maintains a downhole tool temperature substantially within the predetermined temperature calibration.

Another aspect disclosed is a method for estimating a downhole property that includes conveying a downhole tool having a predetermined temperature calibration based at least in part on an expected downhole temperature in a well borehole and adjusting the temperature of the downhole tool during downhole operation to maintain a downhole tool temperature substantially within the predetermined temperature calibration.

Another apparatus disclosed for estimating a downhole property includes a carrier conveyable into a borehole, a fluid analyzer disposed on the carrier, wherein the fluid analyzer includes a device having a predetermined temperature calibration based at least in part on an expected downhole temperature, and a temperature controller in communication with the fluid analyzer to maintain the device substantially within the predetermined temperature calibration.

BRIEF DESCRIPTION OF THE DRAWINGS

For a detailed understanding of the present disclosure, reference should be made to the following detailed description of the several non-limiting embodiments, taken in conjunction with the accompanying drawings, in which like elements have been given like numerals and wherein.

DESCRIPTION OF EXEMPLARY EMBODIMENTS

Figure 1:
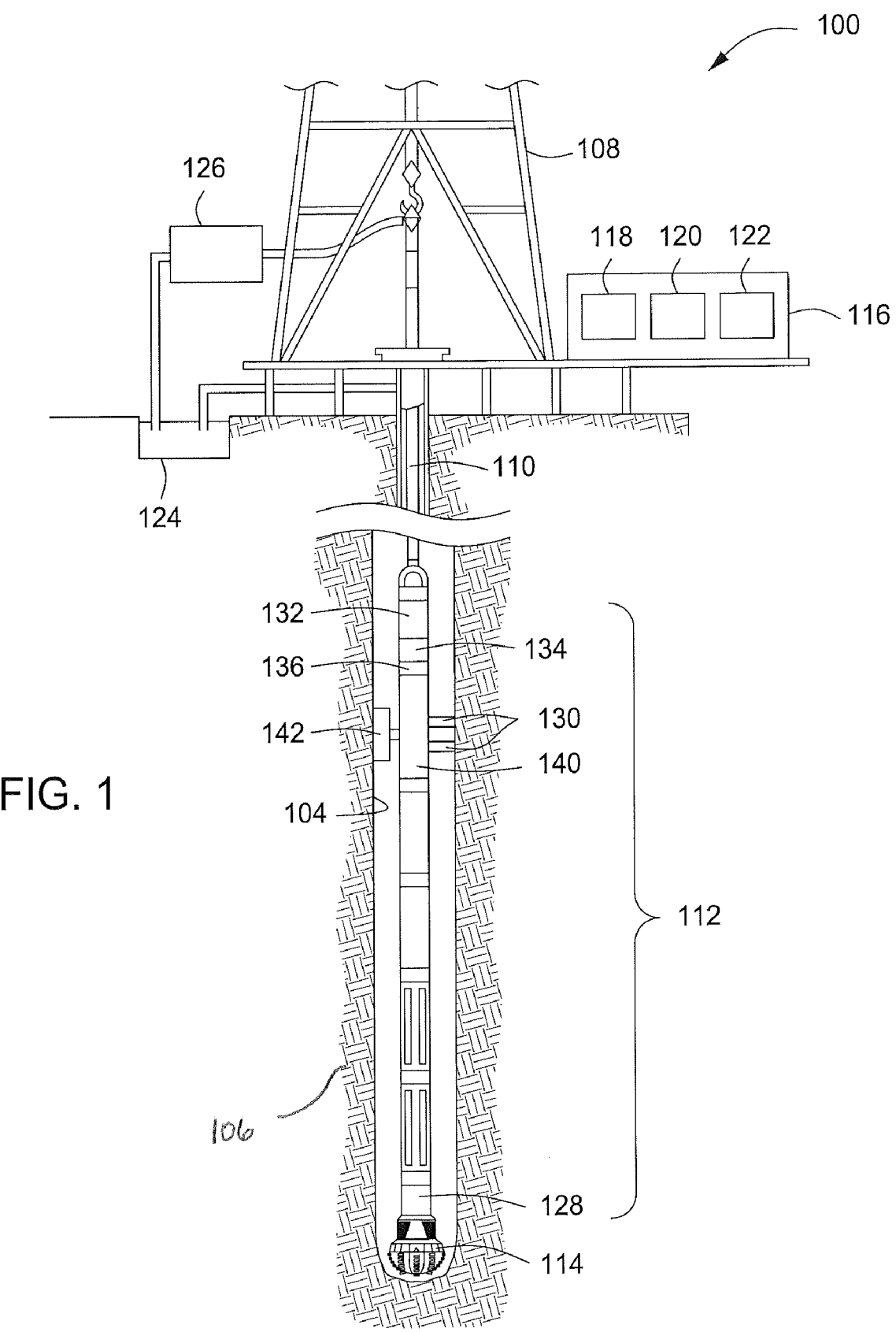
FIG. 1 illustrates a non-limiting example of a while-drilling system according to the disclosure.

FIG. 1 schematically illustrates a non-limiting example of a while-drilling system 100 in a measurement-while-drilling ("MWD") arrangement according to several non-limiting embodiments of the disclosure. The while-drilling system 100 is shown disposed in a well borehole 104 penetrating earth formations 106. The borehole 104 can be filled with a fluid having a density sufficient to prevent formation fluid influx. In one or more embodiments, the borehole 104 may be a reinforced borehole. For example, the borehole 104 can be reinforced with cement, a casing, or both. Reinforcing the borehole 104 can support the borehole and prevent formation fluid influx into the borehole 104.

A derrick 108 supports a drill string 110, which may be a coiled tube or drill pipe. The drill string 110 may carry a bottom hole assembly ("BHA") referred to as a downhole sub 112 and a drill bit 114 at a distal end of the drill string 110 for drilling the borehole 104 through the earth formations 106. The exemplary downhole sub 112 operates as a carrier, but any carrier is considered within the scope of the disclosure. The term "carrier" as used herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slicklines, slickline sondes, drop shots, downhole subs, BHAs, drill string inserts, modules, internal housings and substrate portions thereof.

The downhole sub 112 may be configured to convey information signals to surface equipment 116 by an electrical conductor and/or an optical fiber (not shown) disposed within the drill string 110. The surface equipment 116 can include one part of a telemetry system 118 for communicating control signals and data signals to the downhole sub 112 and may further include a computer 120. The surface equipment 116 can also include a data recorder 122 for recording measurements acquired by the downhole sub 112 and transmitted to the surface equipment 116.

Drilling operations according to several embodiments may include pumping a drilling fluid or "mud" from a mud pit 124 using a circulation system 126 and circulating the mud through an inner bore of the drill sting. The mud exits at the drill bit 114 and returns to the surface through an annular space between the drill string 110 and inner wall of the borehole 104. The drilling fluid may provide hydrostatic pressure that is greater than the formation pressure to avoid blowouts. The pressurized drilling fluid may further be used to drive a drilling motor 128 and may provide lubrication to various elements of the drill string 110.

The exemplary downhole sub 112 may be urged to a side of the borehole 104 using one or more extendable members 130. In other non-limiting examples the downhole sub 112 may be centered within the well borehole by one or more centralizers, for example a top centralizer and a bottom centralizer, attached to the tool string 112 at axially spaced apart locations. The centralizers can be of any suitable type known in the art such as bowsprings, inflatable packers, and/or rigid vanes.

The downhole sub 112 of FIG. 1 illustrates a non-limiting example of a downhole tool 140 for estimating a downhole property, along with several examples of supporting functions that may be included on the downhole sub 112. The downhole tool may include any suitable measurement device configured to measure one or more properties of the borehole 104 and/or the formation 106. The downhole sub 112 in this example is a carrier for conveying several sections of the downhole sub 112 into the borehole 104. The downhole sub 112 includes an electrical power section 132, an electronics section 134, and a mechanical power section 136. The downhole sub 112 may include one or more downhole tools 140.

In one or more embodiments, one or more downhole tools 140 may include a downhole sample extraction tool. In one or more embodiments, the sample extraction tool may include a probe 142 that is opposed by the one or more extendable members 130. The probe 142 may include a sample port for receiving a downhole sample. The downhole sample may be a solid, liquid, gas, or any combination thereof. The probe 142 may be an extendable probe. The probe 142, the one or more extendable members 130, or both may be hydraulically, pneumatically, or electro-mechanically extensible to firmly engage the well borehole wall 104. In another non-limiting embodiment, the probe 142 may be non-extensible, where the one or more extendable members 130 may urge a sample port disposed on the probe 142 toward the borehole wall 104. One or more sample containers may be included for retaining downhole samples recovered by the probe 142. Construction and operational details of suitable fluid extraction tools are thoroughly described by U.S. Pat. Nos. 5,303,775 and 5,377,755 the specifications of which are incorporated herein by reference.

In one or more embodiments, the one or more downhole tools 140 may estimate one or more downhole sample properties. The one or more downhole tools 140 may estimate any type of downhole sample whether solid, liquid, gas, or a combination thereof. Illustrative downhole properties that may be estimated by the one or more downhole tools 140 can include, but are not limited to a temperature, pressure, chemical composition, bubble point pressure, viscosity, electrical resistivity, flow rate, density, pH, optical properties, magnetic susceptibility, dielectric, and formation permeability.

In one or more embodiments, the one or more downhole tools 140 may include one or more emitters. The one or more emitters may emit any suitable source of energy, for example electromagnetic energy. In one non-limiting embodiment the one or more emitters may include a broadband source, a narrow band source, a tunable source, or a combination thereof. In one or more embodiments, the one or more emitters may emit non-collimated energy in the form of light. The emitted electromagnetic energy may include infrared light, visible light, ultraviolet light, or electromagnetic energy that includes two or more spectra. The one or more emitters can emit electromagnetic energy of a selected wavelength or a band of wavelengths.

In one or more embodiments, the one or more downhole tools 140 may include one or more detectors. The one or more detectors may detect or otherwise interpret electromagnetic energy, for example. In one or more embodiments, the one or more emitters may direct electromagnetic energy toward a downhole sample, which can interact with the downhole sample. The one or more detectors may detect or otherwise interpret at least a portion of the electromagnetic energy after interaction with the downhole sample.

The electrical power section 132 can receive or generate, depending on the particular tool configuration, electrical power for the downhole sub 112. In the case of a while-drilling tool configuration as shown in this example, the electrical power section 132 may include a power generating device such as a mud turbine generator, a battery module, or other suitable downhole electrical power generating device. In the case of a wireline configuration, the electrical power section 132 may include a power swivel that is connected to the wireline power cable 108. In some examples, wireline tools may include power generating devices and while-drilling tools may utilize wired pipes for receiving electrical power and communication signals from the surface. The electrical power section 132 may be electrically coupled to any number of downhole tools and to any of the components in the downhole sub 112 requiring electrical power. The electrical power section 132 in the example shown provides electrical power to the electronics section 134.

The electronics section 134 may include any number of electrical components for facilitating downhole tests, information processing, and/or storage. In some non-limiting examples, the electronics section 134 includes a processing system that includes at least one information processor. The processing system may be any suitable processor-based control system suitable for downhole applications and may utilize several processors depending on how many other processor-based applications are to be included in the downhole sub 112. The processor system can include a memory unit for storing programs and information processed using the processor, transmitter and receiver circuits may be included for transmitting and receiving information, signal conditioning circuits, and any other electrical component suitable for the downhole sub 112 may be housed within the electronics section 134.

A power bus may be used to communicate electrical power from the electrical power section 132 to the several components and circuits housed within the electronics section 134 and/or the mechanical power section. A data bus may be used to communicate information between the mandrel section 130 and the processing system included in the electronics section 134, and between the electronics section 134 and the telemetry system 118. The electrical power section 132 and electronics section 134 may be used to provide power and control information to the mechanical power section 136 where the mechanical power section 136 includes electro-mechanical devices. Some electronic components may include added cooling, radiation hardening, vibration and impact protection, potting and other packaging details that do not require in-depth discussion here. Processor manufacturers that produce information processors suitable for downhole applications include Intel, Motorola, AMD, Toshiba, and others. In wireline applications, the electronics section 134 may be limited to transmitter and receiver circuits to convey information to a surface controller and to receive information from the surface controller via a wireline communication cable.

In the non-limiting example of FIG. 1, the mechanical power section 136 may be configured to include any number of power generating devices to provide mechanical power and force application for use by the downhole tool 136. The power generating device or devices may include one or more of a hydraulic unit, a mechanical power unit, an electro-mechanical power unit, or any other unit suitable for generating mechanical power for the one or more downhole tools 140 and other not-shown devices requiring mechanical power.

In several non-limiting examples, the one or more downhole tools 140 may utilize mechanical power from the mechanical power section 136 and may also receive electrical power from the electrical power section 132. Control of one or more downhole tools 140 and other devices on the downhole sub 112 may be provided by the electronics section 134 or by a controller disposed on the downhole sub 112. In some embodiments, the power and controller may be used for orienting the one or more downhole tools 140 within the borehole 104. The one or more downhole tools 140 can be configured as a rotating sub that rotates about and with respect to the longitudinal axis of the downhole sub 112. In other examples, the one or more downhole tools 140 may be oriented by rotating the downhole sub 112 and the downhole tools together. The electrical power from the electrical power section 132, control electronics in the electronics section 134, and mechanical power from the mechanical power section 136 may be in communication with the one or more downhole tools 140 to power and control the downhole tools.

Figure 2:
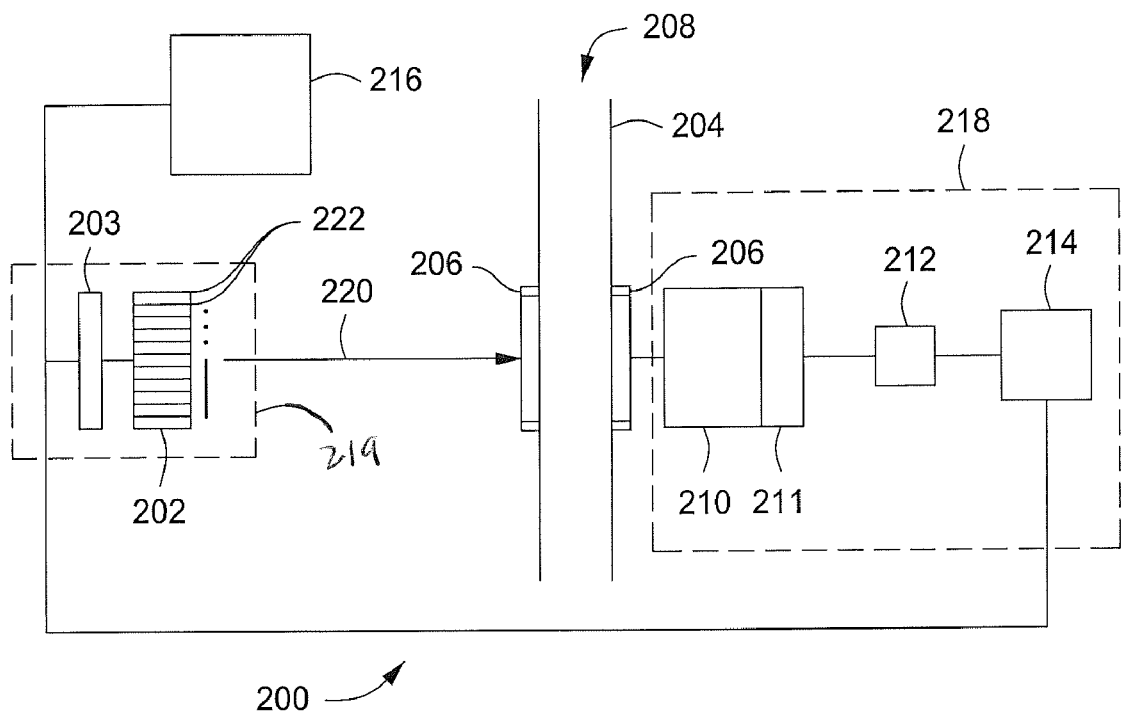
FIG. 2 illustrates a non-limiting example of a downhole tool according to the disclosure.

FIG. 2 schematically illustrates a non-limiting example of a downhole tool 200 for estimating a downhole property according to the disclosure. For simplicity and ease of description, the downhole tool 200 will be further described in the context of a downhole spectrometer. However, it is understood that other downhole property measurement systems, devices, mechanisms, or combinations thereof are also contemplated and within the scope of this disclosure. Those skilled in the art with the benefit of this disclosure will recognize that any suitable downhole measurement system may be used without departing from the scope of this disclosure. Illustrative downhole measurement systems that may be used can include, but are not limited to resistive measurement systems, conductance measurement systems, magnetic measurement systems, and neutron detection systems.

The downhole spectrometer 200 may be incorporated into any of several while-drilling tools, including the downhole tool 140 described above and shown in FIG. 1. In other non-limiting embodiments the downhole spectrometer 200 may be incorporated into any of several wireline tools. In several non-limiting embodiments the downhole spectrometer 200 may estimate one or more downhole sample properties, which may include, but are not limited to electromagnetic measurements, absorption measurements, fluorescence measurements, Raman measurements, nuclear magnetic resonance measurements, emission measurements, or any combination thereof. In one non-limiting embodiment, the downhole spectrometer 200 may be any device suitable for analyzing a fluid, for example the downhole spectrometer 200 may be or include a fluid analyzer.

The downhole spectrometer 200 in the example shown includes an emitter 202, a sample container 204, a detector 210, and two temperature controllers 218, 219 disposed thereon and/or in thermal communication therewith. In several non-limiting embodiments the downhole spectrometer 200 may include a temperature sensor 211 in communication with the detector 210 and/or a temperature sensor 203 in communication with the emitter 202. The temperature sensors 211, 203 can provide an output signal to the temperature controllers 218, 219 indicating the temperature of the detector 210 and the emitter 202, respectively.

In one or more embodiments, the temperature controllers 218, 219 may adjust the temperature of one or more devices or components disposed on the downhole spectrometer 200. For example, the temperature controller 218 in communication with the detector 210 may adjust the temperature of the detector 210. In another non-limiting embodiment, the temperature controller 219 in communication with the emitter 202 may adjust the temperature of the emitter 202. In several non-limiting embodiments the temperature controllers 218, 219 may adjust the temperature of the detector 210 and the emitter 202 to the same temperature or different temperatures. The temperature controllers 218, 219 may be in thermal communication with the detector 210 and the emitter 202, respectively. In one or more embodiments, the temperature controllers 218, 219 can decrease, increase, or maintain the temperature of one or more devices or components disposed on the downhole spectrometer 200 within a desired temperature range. In several non-limiting embodiments, the temperature controller 218 can adjust the temperature of the detector 210 to a predetermined temperature calibration. In another non-limiting embodiment the temperature controller 219 can adjust the temperature of the emitter 202 to a predetermined temperature calibration.

As used herein, the term "predetermined temperature calibration" means a known temperature at which a device has been calibrated based at least in part on an expected downhole temperature. A predetermined temperature calibration may include calibration of a device at one temperature or at a plurality of temperatures. In several non-limiting embodiments a predetermined temperature calibration may include calibrating a device at a temperature while varying one or more operating parameters. For example, a predetermined temperature calibration for a detector may include calibrating the detector at a temperature based at least in part on an expected downhole temperature and may further include varying the intensity of electromagnetic radiation detected by the detector.

In at least one non-limiting embodiment adjusting the temperature of the detector 210 and/or the emitter 202 may be optional. For example, when the detector 210, emitter 202, or other device having a predetermined temperature calibration is at a temperature substantially within the predetermined temperature calibration the temperature of the device may not require adjusting.

In one or more embodiments, the one or more temperature controllers 218, 219 may adjust the temperature of the detector 210, emitter 202, or other device having a predetermined temperature calibration to a temperature substantially within the predetermined temperature calibration continuously, intermittently, or a combination thereof. For example, the one or more temperature controllers 218, 219 can be activated to adjust the temperature of the detector 210, emitter 202, or other device having a predetermined temperature calibration during operation of the downhole spectrometer 200 and deactivated after operation of the downhole spectrometer 200.

In one or more embodiments, the one or more temperature controllers 218, 219 may include any number of devices that may cool the detector 210 and/or the emitter 202. Illustrative cooling devices can include, but are not limited to thermoelectric devices, thermo-tunneling devices, sorption cooling devices, evaporation devices, heat pumps, Stirling coolers and Dewar cooling. In one or more embodiments, the one or more temperature controllers 218, 219 may include any number of devices that may heat the detector 210 and/or the emitter 202. For example, a thermoelectric cooler may also provide heat by reversing the voltage applied to the thermoelectric device. In another non-limiting example a resistive heater may be used.

Calibrating a device or component disposed on the downhole spectrometer 200 to a predetermined temperature calibration based at least in part on an expected downhole temperature prior to conveying the downhole spectrometer 200 into the borehole (see FIG. 1) can provide operational benefits. (For example, the need for calibration of the detector 210 while downhole can be reduced and/or eliminated if the detector 210 has already been calibrated for operation at an expected downhole temperature.) In one embodiment, the device or component is calibrated using a zero offset calibration during operation or while the device or component is downhole. In one embodiment, zero offset calibration is performed while the emitter 202 is deactivated. The temperature controller 218 can adjust the temperature of the detector 210 to substantially within the predetermined temperature calibration. By adjusting the temperature of the detector 210 to substantially within the predetermined temperature calibration reliable information from the detector 210 may be acquired without in situ calibration of the detector 210. In several non-limiting embodiments the detector 210 for example, may be calibrated at a plurality of expected downhole temperatures prior to conveying the downhole spectrometer 200 into the borehole 104. In one non-limiting example the temperature of the detector 210 or other component disposed on the downhole spectrometer 200 and calibrated at a plurality of expected downhole temperatures can be adjusted by the temperature controller 218 to substantially within any one of the plurality of pre-calibrated temperatures. In another non-limiting example the temperature of the device or component disposed on the downhole spectrometer 200 and calibrated at a plurality of expected downhole temperatures can be adjusted by the temperature controller 218 to the lowest predetermined temperature calibration. In one non-limiting embodiment the temperature of the device or component disposed on the downhole spectrometer 200 may be adjusted by the temperature controller 218 to the lowest predetermined temperature calibration achievable under the downhole conditions during operation.

In other non-limiting embodiments, the temperature sensor 211 may be disposed about or in close proximity to a device such as the detector 210. The positioning of the temperature sensor 211 and/or 203 with respect to the device monitored by the temperature sensors can affect the accuracy of the temperature reading acquired by the temperature sensors 211 and/or 203. Therefore, in at least one non-limiting embodiment the temperature sensors 211 and/or 203 may be disposed on or within the detector 210 and/or the emitter 203, respectively.

In one non-limiting embodiment the emitter 202 may include one electromagnetic energy emitter or a plurality of electromagnetic energy emitters 222, as shown. The one or more electromagnetic energy emitters 222 can emit electromagnetic energy which can traverse an emission path 220 toward the sample container 204. In one non-limiting embodiment the emission path 220 may be or include one or more optical fibers 220, and the electromagnetic energy from the one or more optical fibers 220 can interact with a downhole sample 208 and afterwards be detected by the detector 210. In another non-limiting embodiment the emission path 220 may be an air gap. In one or more embodiments the electromagnetic energy emitter 202 may include, but is not limited to one or more lasers, light-emitting diodes, broadband light sources, and combinations thereof.

In one non-limiting embodiment that includes an emitter 202 having a plurality of emitters 222, each of the plurality emitters 222 can include a predetermined temperature calibration that may be the same or different. For example, each of the plurality of emitters 222 may include a different predetermined temperature calibration. This arrangement can provide for adjusting the temperature of the emitter 202 to a temperature substantially within the predetermined temperature calibration of the emitter 222 having the closest temperature to the temperature of the emitter 202 when disposed downhole. Therefore, this arrangement may require less downhole sampling time because less time may be needed to adjust the emitter 222 to substantially within the predetermined temperature calibration. Also, this arrangement may provide for more efficient use of power and/or cooling/heating medium to adjust the temperature of the emitter 222 having a predetermined temperature calibration closest to the actual temperature of the emitter 202 when the downhole spectrometer 200 is disposed downhole.

In several non-limiting embodiments, the downhole spectrometer 200 may include at least one window 206 for receiving, for example electromagnetic energy from the emitter 202, so that the electromagnetic energy may interact with the downhole sample 208 within the sample container 204. Several configurations of sample containers 204 and windows 206 may be used in other embodiments without departing from the scope of the present disclosure. For example, to measure optical transmittance through a sample container 204, one could use a pair of windows 206, as shown. In another non-limiting embodiment, Transflectance measurements may be conducted using a single window with a mirror behind the window and having the fluid sample between the mirror and the window. In at least one non-limiting embodiment, attenuated reflectance measurements may be conducted using a single window in contact with a downhole sample. In several non-limiting embodiments Raman scattering and fluorescence measurements may be conducted using a single window and collecting the resulting light on the same side of the window as the emitter 202. In yet another non-limiting embodiment, light may be collected through a second window from Raman scattering and fluorescence measurements. Depending on the opacity of the downhole sample, the second window could collect the resulting light at 90 degrees from the direction of the emitter.

Continuing with the example of FIG. 2, the detector 210 receives the electromagnetic energy emitted from the emitter 202 after interaction with the downhole sample 208. The detector, which may be a single detector or a plurality of detectors 210 is responsive to the electromagnetic energy emitted from the emitter 202 and provides an output signal indicative of the electromagnetic energy received at the detector 210. In some cases, the detector output signal is an analog electrical signal. An analog-to-digital converter 212 may be used to convert the detector output signal into a digital signal that is received by the detector 210. The output signal from the detector 210 may be received by a processor 214. The processor 214 may interpret the output signal from the detector 210 to estimate one or more downhole sample properties.

In one non-limiting embodiment that includes a detector 210 having a plurality of detectors, each of the plurality detectors can include a predetermined temperature calibration that may be the same or different. For example, each of the plurality of detectors may include a different predetermined temperature calibration. This arrangement can provide for adjusting the temperature of the detector 210 to a temperature substantially within the predetermined temperature calibration of the detector having the closest temperature to the temperature of the detector 210 when disposed downhole. Therefore, this arrangement may require less downhole sampling time because less time may be needed to adjust the detector to substantially within the predetermined temperature calibration. Also, this arrangement may provide for more efficient use of power and/or cooling/heating medium to adjust the temperature of a detector 210 selected from a plurality of detectors that has a predetermined temperature calibration closest to the actual temperature of the detector 210 when the downhole spectrometer 200 is disposed downhole.

In one or more embodiments, the detector 210 may be any suitable detector or plurality of detectors. In one or more embodiments, the detector 210 may include a plurality of detectors that may be the same type of detector, different types of detectors, or combinations thereof. For example, the detector 210 may include one or more optical detectors or photodetectors suitable for detecting the electromagnetic energy emitted from the one or more emitters 202. Other examples include a detector array and a linear image sensor such as a complementary metal-oxide-semiconductor (CMOS) image sensor and an indium gallium arsenide (InGaAs) image sensor. The one or more photodetectors may be selected based in part on the electromagnetic energy emitted by the emitter 202. In one or more embodiments, the detector 210 may include a semiconductor diode, a photodiode, phototransistor, photoresistor, charge-coupled device, or any combination thereof. In another non-limiting embodiment the detector 210 may include a complimentary metal oxide semiconductor ("CMOS").

In one non-limiting embodiment the processor 214 may include a memory for storing the downhole sample property estimations or may transmit the information to a downhole spectrometer controller 216. The controller 216 in the example shown may communicate the information from the processor 214 to the surface equipment 116 or other location. The processor 214 may transmit the downhole sample property estimation to the surface equipment 116 or other location. In one or more embodiments, the controller 216 may be part of the electronics section 134 discussed above and shown in FIG. 1. In wireline embodiments, communication from the processor 214 to the surface equipment 116 or other location and/or from the controller 216 to the surface equipment 116 or other location may be accomplished via a wireline cable. In while-drilling embodiments, communication may be accomplished via wired pipe, acoustic pipe communication, or by mud-pulse telemetry, for example. In the wireline disclosed herein, the emitter 202 may be located at a well borehole surface location and an optical fiber may extend from the surface location to the downhole tool using the wireline cable as a support. In this surface emitter 202 embodiment, the emitter may be controlled at the surface.

Figure 3:
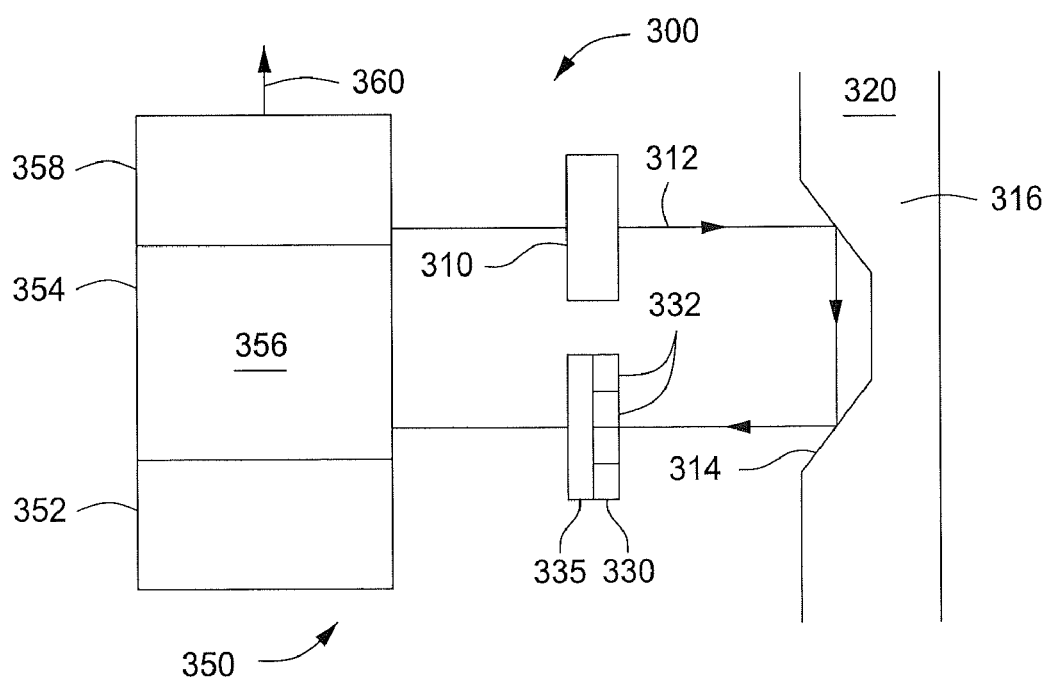
FIG. 3 illustrates another non-limiting example of a downhole tool according to the disclosure.

Referring now to FIG. 3, a schematic diagram illustrates another non-limiting example of a downhole tool 300 that may be used for analyzing downhole samples 320. The downhole tool 300 can be substantially similar to the downhole tools 140 and 200 discussed above and shown in FIGS. 1-2. The downhole spectrometer 300 may include one or more emitters 310, one or more sample containers 316, one or more detectors 330, and one or more temperature sensors 335, which may be substantially as described above and shown in FIG. 2. As shown in FIG. 3 the detector 330 includes a plurality of detectors 332, which may be as discussed above. In one non-limiting embodiment the one or more emitters 310 may emit electromagnetic energy via an emission path 312 into a downhole sample 320 through a window 314 made into a wall of a sample container 316. The emission path 312 from the one or more emitters 310 to the window 314 may include at least one optical fiber, an air gap, or other electromagnetic energy transmission medium. The electromagnetic energy introduced via the emission path 312 interacts with the downhole sample 320 and at least a portion of the electromagnetic energy reflects back to the one or more detectors 330. The one or more detectors 330 produce a signal responsive to the electromagnetic energy, which signal is received by a controller 350 for analysis.

The signal from the one or more detectors 330 may be directed to the controller 350, which may include a processor 352, memory for storing data 354, and computer programs 356. The controller 350 receives and processes the signals received from the detector 330. In one aspect the controller 350 may analyze or estimate the detected light and transmit a spectrum of the detected light to a surface controller using a transmitter 358. In one aspect, the controller 350 may analyze or estimate one or more properties or characteristics of the downhole sample 320 and transmit the results of the estimation to a surface controller using the transmitter 358. In another aspect, the controller 350 may process the signals received from the one or more detectors 330 to an extent and telemeter the processed data to a surface controller for producing a spectrum and for providing an estimate of a property of the downhole sample 320. The spectrum provided by the downhole spectrometer 300 may be used to evaluate, for example oil-based mud contamination and relative components in the downhole sample 320. Other property estimations that may be performed by the downhole spectrometer 300 may be substantially similar to the estimations that may be performed by the downhole tool 140 and the downhole spectrometer 200 discussed above and shown in FIGS. 1-2.

The downhole spectrometer 300 may include one or more temperature controllers 335 in communication with the one or more detectors 330. The one or more temperature controllers can include a temperature sensor, a processor that outputs a signal indicative of a temperature adjustment, and a temperature adjuster that receives the signal and adjusts the temperature of at least one of the one or more detectors 330. In one or more embodiments, the temperature controller may include a closed loop controller.

Figure 4:
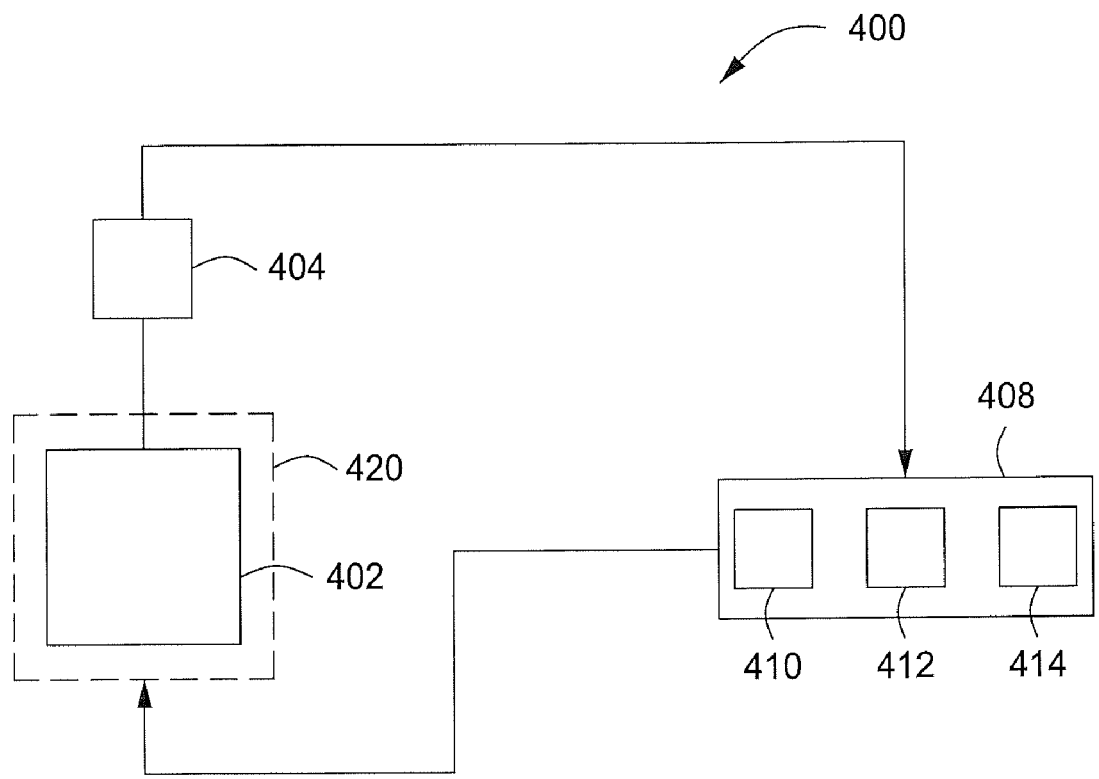
FIG. 4 illustrates a non-limiting example of a temperature controller according to the disclosure.

FIG. 4 illustrates a non-limiting example of a closed loop temperature controller 400 according to one or more embodiments. In several non-limiting examples the closed loop temperature controller 400 may include a device or component 402, a temperature adjuster 420, a temperature sensor 404, and a temperature controller 408. In the non-limiting embodiment depicted in FIG. 4 the temperature controller 408 includes a processor 410, memory 412, and programs 414. In one or more embodiments, the device or component 402 may include any device disposed on a downhole tool. The closed loop temperature controller 400 may be used with the downhole tools 140, 200, and/or 300 discussed above and shown in FIGS. 1-3.

In one non-limiting embodiment the temperature sensor 404 may be disposed in close proximity to the device or component 402. In another non-limiting embodiment the temperature sensor 404 may be disposed directly on the device or component 402. In another non-limiting embodiment the temperature sensor 404 may be disposed within the device or component 402. In at least one embodiment the temperature sensor 404 may be in thermal communication with the device or component 402 using a thermally conductive heat transfer medium. The thermally conductive heat transfer medium may be a thermal paste or thermal grease, for example.

The temperature sensor 404 may output a signal that can be received by the temperature controller 408. The output signal from the temperature sensor 404 may provide the temperature controller 408 with information sufficient to determine the temperature of the device 402 and to direct the temperature adjuster 420, if needed, to adjust the temperature of the device 402. The device or component 402 may include a predetermined temperature calibration. The predetermined temperature calibration may be based at least in part on an expected downhole temperature. The temperature controller 408 may output a signal to the temperature adjuster 420 that can direct the temperature adjuster 420 to adjust the temperature of the device or component 402 to substantially within the predetermined temperature calibration. Should the temperature of the device or component 402 be substantially within the predetermined temperature calibration the controller may direct the temperature adjuster 420 to maintain the temperature of the device or component 402.

In one or more embodiments, the temperature sensor 404 can be any suitable type of temperature sensor. Illustrative temperature sensors can include, but are not limited to thermocouples, resistance temperature detectors ("RTD"), thermally sensitive resistors, for example.

In one or more embodiments, the temperature controller 408 may store information received from the temperature sensor 404 in the memory 412. In one non-limiting embodiment the temperature controller 408 may store multiple temperature information received from the temperature sensor to provide a temperature history of the device or component 402.

In one or more embodiments, the device or component 402 may include any device or component disposed on a downhole tool. For example, the device or component 402 may include an emitter, a detector, or both. The emitter and/or the detector may be substantially similar as discussed above and shown in FIGS. 1-3.

In several non-limiting embodiments the temperature adjuster 420 may include any suitable cooling and/or heating device. The temperature adjuster 420 may include a single device capable of both cooling and heating. Illustrative cooling and/or heating devices can include, but are not limited to thermoelectric devices, thermo-tunneling devices, sorption cooling devices, evaporation devices, heat pumps, Dewar, restive heater, and the like.

Figure 5:
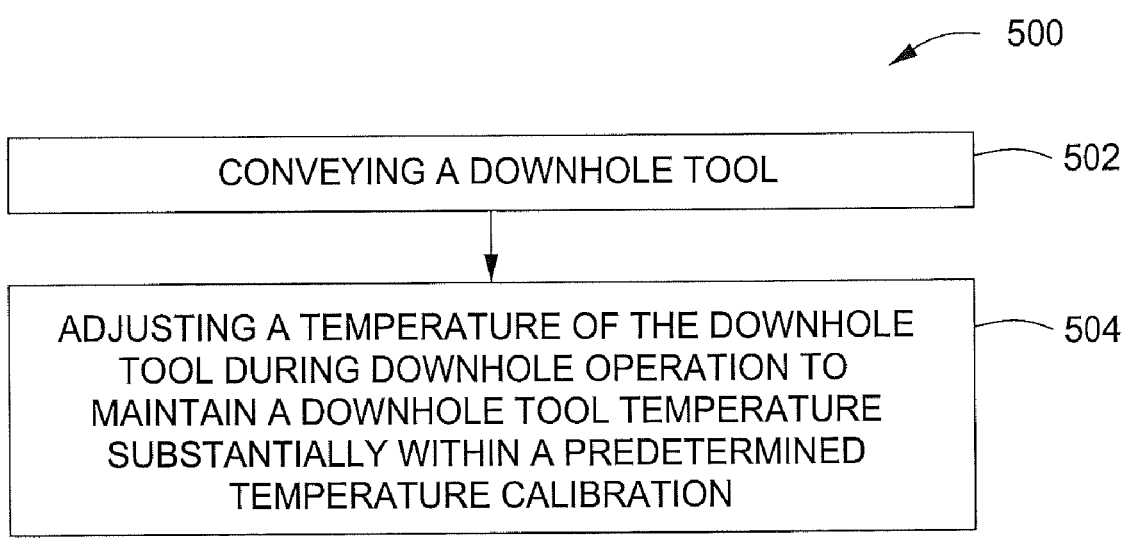
FIG. 5 illustrates a non-limiting example of a method for estimating a downhole property according to the disclosure.

FIG. 5 illustrates one example of a non-limiting method 500 for estimating a downhole property according to the disclosure. The method 500 includes conveying a downhole tool 502. In one non-limiting embodiment conveying the downhole tool 502 may include conveying any downhole tool. Illustrative downhole tools can include the downhole tool 140, the downhole spectrometers 200, 300, and/or the closed loop temperature controller 400 discussed above and shown in FIGS. 1-4. The method 500 may further include adjusting a temperature of the downhole tool during downhole operation to maintain a downhole tool temperature substantially within a predetermined temperature calibration 504.

In one or more embodiments, the predetermined temperature calibration may include a plurality of predetermined temperatures or predetermined temperature ranges. In several non-limiting embodiments the temperature of the downhole tool may be sensed during downhole tool operation and the temperature of the downhole tool may be adjusted using the sensed temperature. In one non-limiting embodiment the temperature of the downhole tool may be adjusted by cooling, heating, or both.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Such insubstantial variations are to be considered within the scope of the claims below.

Given the above disclosure of general concepts and specific embodiments, the scope of protection is defined by the claims appended hereto. The issued claims are not to be taken as limiting Applicant's right to claim disclosed, but not yet literally claimed subject matter by way of one or more further applications including those filed pursuant to the laws of the United States and/or international treaty.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

What is claimed is:

1. An apparatus for estimating a downhole property comprising:
   a downhole tool having a plurality of predetermined temperature calibrations each predetermined temperature calibration based at least in part on an expected downhole temperature; and
   a temperature controller in communication with the downhole tool that maintains a downhole tool temperature substantially within the predetermined temperature calibration that is closest to an actual temperature of the downhole tool when disposed downhole.

2. The apparatus of claim 1, wherein the downhole tool includes one or more of an electromagnetic energy emitter, a fluid sample cell, and a detector.

3. The apparatus of claim 1, wherein the downhole tool includes a plurality of detectors, each of the plurality of detectors having a predetermined temperature calibration corresponding to a different expected downhole temperature.

4. The apparatus of claim 3, wherein the detector includes at least one of an optical detector, a photoresistor, a charge-coupled device, a complementary metal-oxide-semiconductor (CMOS) linear image sensor and an Indium gallium arsenide (InGaAs) linear image sensor.

5. The apparatus of claim 2, wherein the downhole tool includes a plurality of electromagnetic energy emitters, each of the plurality of detectors having a predetermined temperature calibration corresponding to a different downhole temperature.

6. The apparatus of claim 1, wherein the temperature controller includes a closed loop controller.

7. The apparatus of claim 6, wherein the closed loop controller includes a temperature sensor in communication with the downhole tool, a processor that outputs a signal indicative of a temperature adjustment, and a temperature adjuster that receives the signal and adjusts the downhole tool temperature.

8. The apparatus of claim 1, wherein the temperature controller includes at least one of a thermal-electric device, thermo-tunneling device, sorption cooling device, evaporation device, direct heat transfer device, an indirect heat transfer device and a Stirling cooler.

9. A method for estimating a downhole property comprising:
 conveying a downhole tool into a borehole, the downhole tool having a plurality of predetermined temperature calibrations, each predetermined temperature calibration based at least in part on an expected downhole temperature; and
 adjusting the temperature of the downhole tool during downhole operation to maintain a downhole tool temperature substantially within the predetermined temperature calibration that is closest to an actual temperature of the downhole tool when disposed downhole.

10. The method of claim 9, wherein the downhole tool includes at least one of an electromagnetic energy emitter and a detector.

11. The method of claim 9, wherein adjusting the temperature of the downhole tool includes cooling the downhole tool, heating the downhole tool, or both.

12. The method of claim 9, further comprising sensing the temperature of the downhole tool during operation, wherein adjusting the temperature of the downhole tool includes using the sensed temperature.

13. An apparatus for estimating a downhole property comprising:
 a carrier conveyable into a borehole;
 a fluid analyzer disposed on the carrier, wherein the fluid analyzer includes a device having a plurality of predetermined temperature calibrations, each temperature calibration based at least in part on an expected downhole temperature; and
 a temperature controller in communication with the fluid analyzer to maintain the device substantially within the predetermined temperature calibration that is closest to an actual temperature of the downhole tool when disposed downhole.

14. The apparatus of claim 13, wherein the temperature controller includes at least one of a thermal-electric device, thermo-tunneling device, sorption cooling device, evaporation device, direct heat transfer device, indirect heat transfer device and a Stirling cooler.

15. The apparatus of claim 13, wherein the device includes a detector.

16. The apparatus of claim 13, wherein the temperature controller includes a closed loop controller.

17. The apparatus of claim 16, wherein the closed loop controller includes a temperature sensor in communication with the device, a processor that outputs a signal indicative of a temperature adjustment, and a temperature adjuster that receives the signal and adjusts the device temperature.

\* \* \* \* \*